INVENTOR.
JAMES L. LUMMUS

Jan. 26, 1971  J. L. LUMMUS  3,558,545
LOW SOLIDS DRILLING FLUID
Original Filed May 12, 1967  2 Sheets-Sheet 2

INVENTOR.
JAMES L. LUMMUS

ATTORNEY

3,558,545
Patented Jan. 26, 1971

3,558,545
LOW SOLIDS DRILLING FLUID
James L. Lummus, Tulsa, Okla., assignor to Pan American Petroleum Corporation, Tulsa, Okla., a corporation of Delaware
Continuation of application Ser. No. 637,985, May 12, 1967, which is a continuation-in-part of application Ser. No. 392,627, Aug. 27, 1964. This application Mar. 27, 1968, Ser. No. 738,663
Int. Cl. C08f 3/44, 3/64, 3/90, 15/38, 45/06, 47/18
U.S. Cl. 260—29.6
8 Claims

ABSTRACT OF THE DISCLOSURE

A combination of a polyacrylate and an acrylate-acrylamide copolymer is used to beneficiate bentonite but flocculate other clays in low-solids drilling fluid. Both polymers have molecular weights above about 2 million but below about 20 million. A process using a dilution step makes possible applying the polymers to high-solids muds. Each polymer may be used alone in some cases.

---

Figure 1:
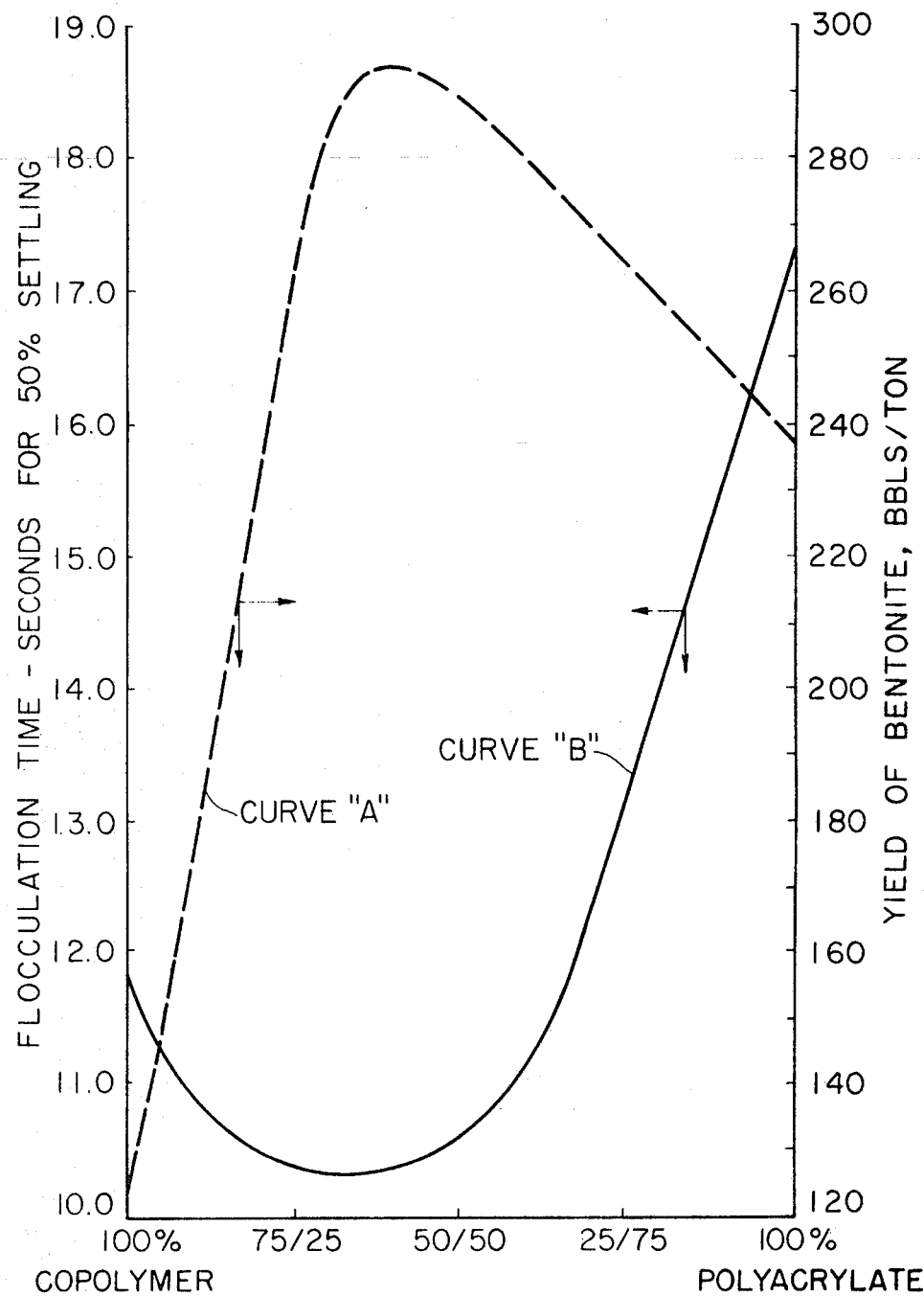

This application is a division of U.S. Patent Application Serial Number 637,985, entitled "Method for Removing Solids from Drilling Fluid," filed May 12, 1967, and now abandoned. Application Serial No. 786,341, filed Dec. 23, 1968, a continuation-in-part of Application Serial Number 637,985 issued on Oct. 14, 1969, as U.S. Patent 3,472,325, entitled "Method of Drilling with Polymer-Treated Drilling Fluid." U.S. Patent Application Serial Number 637,985 is a continuation-in-part of my U.S. Patent Application Serial Number 392,627, entitled "Beneficiating Bentonite," filed on Aug. 27, 1964, and now abandoned.

In the last few years, use of low-solids drilling fluids in well drilling has increased due to the faster drilling rates which can be obtained by use of these fluids. In general, the lower the concentration of colloidal solids, the faster is the drilling rate. Chemicals were developed to flocculate all the solids so the drilling fluid was clear water. This was found to be undesirable in many cases because of poor ability to lift cuttings from the well and because of high loss of water to the drilled formations.

The result of the above conditions has been a compromise in which enough colloidal solids are maintained to provide acceptable rates of cuttings removal and of water loss, even though considerable drilling rate is sacrificed. An improvement has been the use of vinyl-maleic copolymers, which beneficiate bentonite and flocculate other clays. Use of such polymers is described in U.S. Pat. 3,070,543 Scott. Use of the polymer permits removal of drilled solids other than bentonite while at the same time permitting use of less bentonite to maintain the required ability to lift bit cuttings and reduce fluid loss to the drilled formations. The lower bentonite content and absence of other drilled solids has provided improved drilling rates.

Commercial success of the vinyl-maleic copolymers has encouraged extensive work to improve the vinyl-maleic copolymers and to discover other polymers which perform the dual functions better than the vinyl-maleic copolymers. Use of mixtures of polymers has seemed promising but the strong flocculants generally seem to be incompatible with the strong beneficiating agents, so little has come of the work.

The incompatibility arises partly out of undesirable reactions such as those between cationic and anionic polymers. Incompatibility seems to arise even more out of conflicts between actions of two polymers on a single type of clay. For example, a combination of a polymer which is a flocculant for all clays with one which is a beneficiating agent for all clays may affect a specific clay, such as bentonite, very little because of the conflicting actions of the two polymers. Each polymer can interfere with the action of the other on the surface of the bentonite particles.

An object of this invention is to provide a polymer, copolymer, or mixture of polymers, capable of beneficiating bentonite more effectively than the vinyl-maleic polymers and also capable of flocculating other clays more effectively than the vinyl-maleic copolymers. A more specific object is to provide a compatible mixture of a strong beneficiating agent for bentonite and a strong flocculating agent for other clays. A still more specific object is to provide a mixture of polymers which are not only compatible but which exert a synergistic action, each aiding the other in its function.

We have now found that a combination of polyacrylates and certain acrylate-acrylamide copolymers, both being of very high molecular weight, is unusually effective, not only in beneficiating bentonite, but also in flocculating other clays. Both the polyacrylate and the copolymer must be water soluble. Preferably, they should be the sodium salts.

Figure 2:
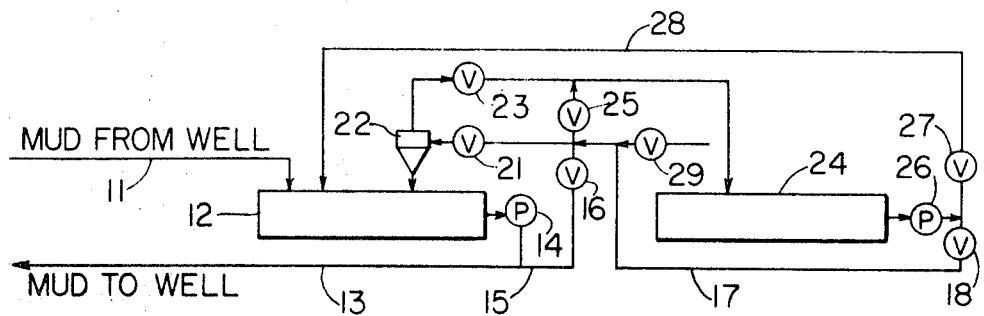

In the drawing, FIG. 1 is a pair of curves showing the effects of examples of the polymers on each other. FIG. 2 is a flow diagram of a process permitting use of polymers in high-solids muds.

In FIG. 1, the curves are the results of two different tests. Curve A represents the results of a test of flocculating ability for clays other than bentonite. Curve B represents the results of tests of beneficiating ability for bentonite.

The "yield" of a bentonite is expressed as the number of barrels of 15 centipoises mud which can be prepared from one ton of clay. The effectiveness of polymers in increasing yield was determined by adding .05 pound per barrel of the polymer and redetermining the yield. Solutions of 1 percent (wt.) of the polymers are used to insure adequate mixing of the polymer in the mud and to avoid the weighing of the small quantities of polymer required. The concentration of bentonite used is 2, 3, and 4 percent by weight, or 7, 10.5 and 14 pounds per barrel, and if the yield is low, possibly 5 percent (17.5 pounds per barrel) will be necessary. The bentonite is added to 350 milliliters of water in a quart jar. It is then mixed on a Hamilton Beach Mixer, Model 30, at approximately 12,000 r.p.m. for a total of 20 minutes. After 10 minutes of mixing, any bentonite which is on the sides of the jar is scraped back and mixing is continued for 5 minutes. The polymer is then added, generally 5 cc. of a 1 percent solution (.05 pound per barrel) and the mud is mixed for the remaining 5 minutes. The properties are measured immediately after mixing, a Fann viscosimeter being used, and the fluid loss is also determined. To calculate the yield the logarithm of the apparent viscosity (½ of the 600 r.p.m. Fann reading) is plotted against the clay concentration in pounds per barrel. From the plotted data, the clay concentration required to give a viscosity of 15 cps. is determined. The yield in barrels per ton is calculated by the following equation:

$$Y = 2.3 + \frac{2000}{c}$$

Where:

$Y$ = yield in barrels per ton.
$c$ = clay concentration in pounds per barrel.

The basic method used to evaluate polymers for flocculation of low-yield clay is as follows: 4.0 grams of clay are added to approximately 90 milliliters of water in a stoppered 100-milliliter graduated cylinder. The clay-water mixture is thoroughly mixed by shaking, then is made up to 99 milliliters with water. 1.0 milliliter of the polymer solution (1 percent by weight) is added and the mixture agitated for one minute by inverting the cylinder. The cylinder is then placed in an upright position and the timer started. The height (in milliliters) of the interface between the clear water and the flocculated settling solids is read and recorded at the following time intervals, 10 seconds, 30 seconds, 50 seconds, 80 seconds, 100 seconds, 140 seconds, 200 seconds, and 400 seconds. The logarithm of the time is plotted against the height of the interface. From the curve drawn, the time to obtain 50 milliliters of settling is determined and reported. The height of the solids after 10 seconds will give somewhat of a measure of the time for the flocs to form and the 400-second reading will indicate the floc size.

The described tests were used for determining the effects of polymers and mixtures of the polymers on bentonite and on other clays. FIG. 1 shows the copolymer had little effect on bentonite but had an outstanding ability to flocculate other clays. The polyacrylate, on the other hand, had a very great beneficiating action on bentonite. The polyacrylate also had a considerable flocculating action on non-bentonitic clays, but not as great an effect as the copolymer. The shapes of the curves between 100 percent copolymer and 100 percent polyacrylate show that mixtures, in which the ratio of copolymer to polyacrylate was between about 75 to 25 and about 30 to 70, provided better bentonite beneficiating action than the polyacrylate and better flocculating action than the copolymer. Thus, not only were the polymers compatible, but they produced a synergistic action, each enhancing the ability of the other to perform its principal function.

The acrylate-acrylamide copolymer used to obtain the results shown in the drawing was prepared by polymerizing about 5 mole percent acrylic acid with about 95 mole percent acrylamide. The polymerization was continued until a polymer having a molecular weight of between about 4 million and about 6 million, as determined by the light-scattering technique, was produced. For the light-scattering technique, see, for example, Techniques of Polymer Characterisation, edited by P. W. Allen, 1959 ed., Butterworth Scientific Publications, London, England. The polyacrylate was also carried to a very high molecular weight well over 2 million by the light-scattering technique. The polymerization method was that described in Canadian Pat. 734,551.

In general, the copolymer should have a ratio of acid to amide groups between about 2 to 98 and about 10 to 90. Preferably, the ratio should be between about 4 to 96 and about 6 to 94. The copolymer molecular weight should be between about 3 million and about 20 million and preferably from about 4 million to about 10 million. The polyacrylate molecular weight should be between about 2 million and about 20 million and preferably from about 3 million to about 10 million. Even within these limits, considerable variations in properties were found. For example, the results shown in the drawing were obtained with pilot plant batches of chemicals. Commercial runs of polymers of somewhat higher molecular weights were as compatible as the pilot plant polymers but did not show as much synergistic effects.

If the benonite and combined polymers are premixed dry before use, the polymers should be present in a concentration between about 0.1 and about 5 parts by weight per 1000 parts of bentonite.

One word of caution seems advisable with regard to the flocculation test. Fairly accurate and reproducible results are obtained with this test at flocculation times of about 20 seconds or more. For flocculation times around 10 seconds or less, large observational differences occur between different technicians testing the same material and even between repeated tests of the same polymer by the same observer. Therefore, flocculation rate times less than about 10 seconds should be regarded as of qualitative significance only.

The effects of various concentrations of 40 percent polyacrylate and 60 percent copolymer on various concentrations of bentonite are shown in Table I. In these tests, fluid losses were measured by the standard API procedure. Viscosity, yield values, and gel strengths were measured with a Fann viscosimeter, also in accordance with standard API procedures.

TABLE I

| Test No.: | Percent bentonite | Amount polymer lbs./bbl. | Apparent visc., cps. | Plastic visc., cps. | Yield value, lbs./100 sq. ft. | Bank gels, lbs./100 sq. ft. 10 sec. | 10 min. | Fluid loss, cc. 30 min. |
|---|---|---|---|---|---|---|---|---|
| 1 | 1 | | 1.25 | 1.0 | .5 | 0 | 0 | 38 |
| 2 | 2 | | 1.75 | 1.5 | .5 | 0 | 0 | 23 |
| 3 | 3 | | 2.5 | 2 | 1 | 0 | 0 | 19 |
| 4 | 4 | | 4.25 | 3.5 | 1.5 | 0 | 2 | 14.5 |
| 5 | 5 | | 7.5 | 6 | 3 | 1 | 11 | 12.5 |
| 6 | 1 | .01 | 3.0 | 2 | 2 | 0 | 2 | 50 |
| 7 | 2 | .01 | 7.25 | 4.5 | 5.5 | 4 | 6 | 26 |
| 8 | 3 | .01 | 9 | 5 | 8 | 3 | 8 | 19 |
| 9 | 4 | .01 | 11.5 | 7 | 9 | 3 | 10 | 15 |
| 10 | 5 | .01 | 19 | 12 | 14 | 4 | 14 | 12.5 |
| 11 | 1 | .025 | 3.75 | 2.5 | 2.5 | 0 | 2 | 51 |
| 12 | 2 | .025 | 12.5 | 6 | 13 | 7 | 10 | 27 |
| 13 | 3 | .025 | 20 | 7 | 26 | 15 | 24 | 19 |
| 14 | 4 | .025 | 26 | 9 | 34 | 17 | 26 | 14.5 |
| 15 | 5 | .025 | 38 | 15 | 46 | 24 | 35 | 11 |
| 16 | 1 | .05 | 3.5 | 2.5 | 2 | 0 | 2 | 33.8 |
| 17 | 2 | .05 | 16 | 7 | 18 | 9 | 14 | 26.5 |
| 18 | 3 | .05 | 30 | 8 | 44 | 31 | 46 | 18.5 |
| 19 | 4 | .05 | 45 | 12 | 66 | 47 | 68 | 14.0 |
| 20 | 5 | .05 | 67 | 20 | 94 | 62 | 86 | 11.8 |
| 21 | 2 | 0.1 | 12.5 | 6 | 13 | 4 | 11 | 15.4 |
| 22 | 3 | 0.1 | 41.5 | 11 | 61 | 35 | 60 | 17.0 |
| 23 | 2 | 0.25 | 8 | 6 | 4 | 1 | 2 | 11.4 |
| 24 | 3 | 0.2 | 46 | 15 | 62 | 24 | 68 | 13.0 |

Data in Table I show that as little as 0.01 pound of the mixed polymers per barrel of drilling fluid produces considerable effect. This is particularly true with concentrations of bentonite in the range of 4 or 5 percent by weight. It will be apparent that even less polymer will produce some results but a minimum treatment of about 0.01 pound per barrel should ordinarily be used. When the term "barrel" is used herein, one containing 42 U.S. gallons is intended.

The maximum concentration of mixed polymers to be used depends upon the nature of the drilling fluid. If a low-solids drilling fluid is to be maintained, then the yield value should not exceed about 22 and the 10-second gel strength should not exceed about 17 pounds per 100 square feet. Otherwise, there is too little tendency for flocculated solids to settle in the mud pits. If a low-solids drilling fluid is to be maintained, either the mixed polymer concentration or the bentonite concentration should be limited sufficiently to permit the flocculated solids to settle. If the drilling fluid is not a low-solids system, however, the upper limit of mixed polymer concentration should be about 0.1 pound per barrel of drilling fluid. Higher concentrations can be used for fluid loss control as shown by tests 21 to 24 in Table I. These higher concentrations sometimes are not as effective as lower concentrations for increasing viscosity, however, as shown by tests 21 and 23. As described later, fluid loss control can be obtained easily by other means. Therefore, it is generally best to use no more than about 0.1 pound of the mixed polymers per barrel of drilling fluid. It is rarely advisable to use more than about 1.0 pound per barrel.

A bentonite concentration of as little as 1 percent by weight (about 3.5 pounds per barrel of drilling fluid) provides some viscosity increase in the presence of the mixed polymers. Preferably, however, at least about 1.5 percent or 2 percent bentonite should be used. As much as 5 percent, or even more bentonite can obviously be 500,000. A concentration of up to about 0.75 pound of this polymer per barrel of drilling fluid greatly decreases fluid loss from the drilling fluid without excessively decreasing drilling rates. In field tests of the mixed high-molecular weight copolymer and polyacrylate, the 500,000 molecular weight polyacrylate was used. Low concentrations produced fluid losses as low as about 6 milliliters in 30 minutes.

If a low-solids content is to be maintained in a drilling fluid, the flocculated solids must be able to settle in the mud pits. As previously noted, the yield value of the drilling fluid should be less than about 22 and the 10-second gel strength should be less than about 17 pounds per hundred square feet. It will be obvious that the yield values or 10-second gel strengths, or both, are too high in tests 13, 14, 15, 18, 19 and 20 of Table I. This difficulty can be made worse by drilled solids, as shown in Table II.

TABLE II

| Test No. | Percent bentonite | Polymer | Amount lb./bbl. | Low yield clay, percent | Caustic quebracho, lb./bbl. | Apparent visc., cps. | Plastic visc., cps. | Yield value, lb./100/ sq. ft. | Fann gels, lb./10 sq. ft. 10 sec. | Fann gels, lb./10 sq. ft. 10 min. | Fluid loss, cc./30 min. |
|---|---|---|---|---|---|---|---|---|---|---|---|
| 1 | 3 | (60-40) copolymer polyacrylate | .05 | | | 34.5 | 10 | 49 | 32 | 36 | 20.4 |
| 2 | 3 | do | .05 | 3 | | 35.5 | 8 | 55 | 39 | 51 | 16.4 |
| 3 | 3 | do | .05 | 3 | .2 | 22 | 8 | 28 | 18 | 32 | 16.8 |
| 4 | 2 | do | .025 | | | 15 | 7 | 16 | 9 | 14 | 25.2 |
| 5 | 2 | do | .025 | 3 | | 16 | 5 | 22 | 14 | 18 | 26.5 |
| 6 | 2 | do | .025 | 3 | .2 | 7.5 | 4 | 7 | 4 | 9 | 20.5 |
| 7 | 3 | Polyacrylate | .05 | | | 33 | 11 | 44 | 26 | 48 | |
| 8 | 3 | do | .05 | 3 | | 40.5 | 9 | 63 | 30 | 28 | |
| 9 | 3 | do | .05 | 3 | .2 | 33 | 8 | 50 | 26 | 37 | 18.0 |
| 10 | 2 | do | .025 | | | 13 | 6 | 14 | 6 | 8 | |
| 11 | 2 | do | .025 | 3 | | 17 | 6 | 22 | 14 | 18 | |
| 12 | 2 | do | .025 | 3 | .2 | 12.7 | 5 | 14.5 | 6 | 11 | 24.0 |
| 13 | 3 | Copolymer | .05 | | | 4.5 | 3 | 3 | 0 | 3 | |
| 14 | 3 | do | .05 | 3 | | 5 | 4 | 2 | 0 | 4 | |
| 15 | 3 | do | .05 | 3 | .2 | 3.7 | 3 | 1.5 | 0 | 1 | 12.0 |
| 16 | 2 | do | .025 | | | 2.3 | 2 | 0.5 | 0 | 0 | |
| 17 | 2 | do | .025 | 3 | | 2.5 | 2 | 1 | 0 | 0 | |
| 18 | 2 | do | .025 | 3 | .2 | 2.3 | 2 | 0.5 | 0 | 0 | 21.0 | used, particularly when the mixed polymer concentration is low. Thus, a mixture of 5 percent bentonite and 0.01 pound per barrel mixed polymers is suitable even for a low-solids drilling fluid. For other than low-solids drilling fluid, the bentonite content can be higher, for example, up to 7 or 8 percent. The upper limit is the concentration which produces a slurry which is still pumpable. As noted in connection with the upper limit on the concentration of polymers, the upper limit of either polymer or bentonite concentration depends upon the concentration of the other. Preferably, the bentonite concentration should be between about 2 percent and about 5 percent (about 7.0 to about 17.5 pounds per barrel of drilling fluid). Customarily, bentonite concentrations are given in weight percent. In weighted muds, however, the concentrations in pounds per barrel should be used.

For a low-solids drilling fluid system, the bentonite concentration is preferably from about 2 percent to about 4 percent, while the polymer concentration is preferably from about 0.02 to about 0.04 pound per barrel of drilling fluid. In such systems, it is generally advisable to keep the bentonite concentration as low as possible in order to obtain the higher drilling rates which accompany lower mud solids contents of the drilling fluid.

In the early days of low-solids drilling fluids, considerable emphasis was placed on obtaining low fluid loss values since the fluid loss from these muds was usually rather high. As experience has been obtained with low-solids muds, however, it has been found possible to tolerate much higher fluid loss rates than were previously considered advisable. There are still circumstances, such as drilling water-sensitive formations, when the fluid loss should be low. As noted above, better fluid loss control can be obtained by use of higher concentrations of mixed polymers. It is generally better, however, to reduce fluid loss by use of a fluid loss reducer which is compatible with the mixed polymers and provides great decreases in fluid loss at low concentrations. Such a fluid loss reducer is sodium polyacrylate having a molecular weight of about In the table, the caustic and quebracho were added in equal amounts, 0.2 pound per barrel being 0.1 pound of each per barrel of drilling fluid. With regard to use of the combination of polymers in low-solids mud, the effect of the caustic and quebracho is the most important point in Table II. Test 1 of Table II shows that 3 percent bentonite and 0.05 pound of combined polymers is too much to be used in low-solids muds even without drilled solids. The yield value and 10-second gel of the resulting mud is too high to permit settling of flocculated solids. This has been previously explained. Test 2 shows the presence of drilled solids, such as the low-yield clay used in the test, makes the problem worse. Test 3 shows that only 0.2 pound per barrel of caustic and quebracho brings the yield value and 10-second gel down almost low enough to permit settling of flocculated solids. A little more caustic and quebracho does permit maintaining the solids content of the drilling fluid at a low level.

Tests 4, 5 and 6 show it is much better to use lower concentrations of both bentonite and the combination of polymers. Again, if the yield value or 10-second gel gets a little high, it is possible to reduce these values by adding a very small amount of caustic and quebracho.

Tests 13 to 18 show the extremely small effects of the copolymer on bentonite. Tests 7 to 12 show the very great effects of the polyacrylate on bentonite. A comparison of tests 7 to 12 to tests 1 to 6 shows that while the copolymer alone has little effect on bentonite, the combination with the polyacrylate produced, in some respects, a greater effect on bentonite than the polyacrylate alone. This is better shown in FIG. 1 of the drawing.

The differences between the high molecular weight polymers and the lower molecular weight ones used in the past are rather remarkable. In the past, polyacrylates having a molecular weight of a few hundred thousand have been used in drilling fluids mostly for fluid loss control. Some of them were known to give some beneficiating actions with bentonite. See, for example U.S. Pat. 2,700,788 Dawson. Dawson shows that the yield of mud from a typical bentonite clay can be increased from about 88 up to 162 barrels per ton by use of about 0.2 pound of polyacrylates per barrel of drilling fluid. This is an increase of about 74 barrels per ton. By increasing the molecular weight into the range from about 2 million to about 20 million, the beneficiating action is increased so much that use of only about 0.05 pound per barrel of drilling fluid increases the bentonite yield to more than 260 barrels per ton. This is well over twice the increase produced by four times the amount of lower molecular weight polyacrylate.

Increased molecular weight makes an even greater difference in the case of the copolymer. The same copolymer at low molecular weights provides considerably less flocculating action on non-bentonitic clays and has a pronounced effect on bentonite. By increasing the molecular weight into the range from about 3 million to about 20 million, the flocculating ability on non-bentonitic clays is greatly increased. At the same time, the effect of the copolymer on bentonitic clays is substantially eliminated. This drastic change in the effect of the copolymer on bentonite by simply changing the molecular weight of the copolymer is quite surprising. As explained later, advantage can be taken of this changed property in high-solids muds.

Returning to use of the combination of polymers in low-solids muds, one other factor should be considered. This is the effect of calcium ions. This effect is shown in Table III.

TABLE III

| Test No.: | Bentonite, percent mixture | Low-yield clay, percent mixture | Calcium ion, p.p.m. | Settling time, seconds |
|---|---|---|---|---|
| 1 | 50 | 50 | 0 | 80 |
| 2 | 50 | 50 | 100 | 4 |
| 3 | 50 | 50 | 200 | 3 |
| 4 | 50 | 50 | 500 | 2 |
| 5 | 70 | 30 | 0 | >400 |
| 6 | 70 | 30 | 100 | 9 |
| 7 | 70 | 30 | 200 | 10 |
| 8 | 70 | 30 | 500 | 8 |
| 9 | 30 | 70 | 0 | 13 |
| 10 | 30 | 70 | 100 | 2 |

The results shown in Table III were obtained by the flocculation test previously described. For reasons explained below, this test was run using a mixture of bentonite and low-yield clays in a total concentration of only 1 percent by weight in fresh water. This suspension was treated with 0.01 pound per barrel of a mixture of 60 percent copolymer and 40 percent polyacrylate. Sufficient concentrated solution of calcium chloride was then added to provide the calcium ion concentration shown.

From the data in Table III, it will be obvious that, at very low bentonite concentrations, the presence of calcium ion permits rapid flocculation of the bentonite together with low-yield clays. This is important in certain operations where it is desired to drill a section of a well with clear water and then mud up. The polymer combination can be used in such cases to flocculate drilled solids and thus maintain clear water. Sometimes the drilled formation contains a small amount of bentonite. If enough bentonite is present, the flocs of other clays will not carry the bentonite down with them. In such cases, the addition of a little calcium chloride will permit flocculation of the bentonite as well as the drilled solids, thus permitting clear water to be maintained. When it is desired to mud up, it is only necessary to add a little sodium carbonate to remove the calcium ions. Added bentonite is then beneficiated by the combination of polymers to establish the desired viscosity and gel strength.

In tests 1 and 5, where substantially no calcium ion was present, very long settling times are noted. It should be explained that the low-yield clay is flocculated and settles just as fast as ever. It is the bentonite which does not settle. It remains dispersed forming a very opaque muddy water in which the flocs of low-yield clay are difficult to observe. It is of interest to note that, if a large amount of low-yield clay is present with little bentonite, the flocs of low-yield clay can carry the bentonite down with them much as flocs formed by adding alum to water are sometimes used to sweep suspended solids down to the bottom of water and thus clarify turbid waters. A little calcium ion helps even in this case, however.

Apparently, the calcium tends to form calcium bentonite. Therefore, if more bentonite is present, higher concentrations of calcium ions should be provided. The data in Table III show that for most purposes 100 parts per million of calcium ions is more than adequate.

The combination of polymers is useful in salt muds, whether these are low-solids muds or not. It is true that high salt concentrations substantially destroy the bentonite beneficiating action of the combination. The polymers are still apparently associated with the clays, however, since, if the bentonite is pre-hydrated in fresh water in the presence of the polymers before being added to salt water, the bentonite does not deteriorate in use as ordinary prehydrated bentonite does. This is shown in Table IV.

TABLE IV

| Test No. | 5 percent bentonite, cc. | 5 percent copolymer polyacrylate, cc. | Sat. brine, cc. | Rolling 18 hrs. at 120° F. | Plastic visc., cps. | Yield value, lbs./100/ sq. ft. | Fann gels, lbs./100/ sq. ft. | | Fluid loss, cc. 30 min. |
|---|---|---|---|---|---|---|---|---|---|
| | | | | | | | 10 sec. | 10 min. | |
| 1 | 175 | | 175 | | 3.0 | 28.0 | 18 | 22 | 100 |
| 2 | 175 | | 175 | Yes | 3.0 | 14.0 | 8 | 11 | 132 |
| 3 | | 175 | 175 | | 3.0 | 26.0 | 16 | 19 | 106 |
| 4 | | 175 | 175 | Yes | 3.0 | 33.0 | 18 | 22 | 133 |

In the tests reported in Table IV, the bentonite was first prehydrated in fresh water and was then mixed with the saturated salt water and the properties of the mixture were measured. The mixtures were then placed in jars which were rolled for 18 hours at 120° F. Properties were then again measured. It will be obvious from the results that the presence of the combination of polymers stabilized the bentonite so the viscosity, yield value and gel strengths of the drilling fluid remained substantially constant. As explained before, the fluid loss can be decreased by use of water-soluble polyacrylates having a molecular weight in the hundreds of thousands range. These are effective in salt water as well as in fresh water.

The mixed polymers can also be added to salt water muds to flocculate drilled solids. The flocculation test previously described was run substituting salt water with various concentrations of salt for the fresh water ordinarily used. With salt concentrations varying from 27,500 parts per million up to saturated salt water, the low-yield clay did not settle to the 50 milliliter mark in 400 seconds in the absence of the polymers. In the presence of the mixed polymers (60 percent copolymer and 40 percent polyacrylate) settling times between about 15 and about 19 seconds were obtained.

The combination of polymers is also, of course, useful in high-solids fresh water muds. For example, the polymers can be used in weighted muds. In such muds, the combination performs two functions. First, it beneficiates bentonite, permitting use of less of this material. Second, the polymers stabilize bit cuttings. In a sense, the bit cuttings are flocculated before they can disperse. Actually, the polymers simply prevent disintegration of the cuttings so they can be removed in the shale shaker.

A certain percentage of drilled solids passes through the shale shaker. A low-solids mud may be defined as one from which these solids, if flocculated, will settle. A high-solids mud, then, is one having a sufficiently high yield value or initial gel strength to prevent settling of flocculated solids. Removal from such a high-solids mud of drilled solids which pass the shale shaker presents a problem. A process for solving this problem is shown in the diagram of FIG. 2 in the drawing. In this diagram, mud comes from the well through mud trough or conduit 11 and runs into mud pit 12. Mud is withdrawn from this pit and circulated back to the well through line 13 by pump 14. A part of the mud stream is withdrawn through line 15. The volume is regulated by control valve 16. This mud stream is mixed with a diluting stream flowing through line 17, the volume of which is regulated by control valve 18.

The mixed stream may flow through valve 21, hydrocyclone or centrifuge 22, and valve 23 to settling pit 24. This flow path is used if the mud circulated in the well is weighted. The hydrocyclone or centrifuge acts in this case to remove the weighting agent from the diluted mud stream and return the weighting agent to mud pit 12 before the diluted mud is sent to settling pit 24. If the mud is not weighted, the hydrocyclone or centrifuge is not needed. In this case, valves 21 and 23 are closed and valve 25 is opened so the diluted mud passes directly to settling pit 24.

Control valves 16 and 18 are regulated so the diluted mud passing to settling pit has a yield value and 10-second gel sufficiently low to cause flocculated drilled solids to settle in settling pit 24. Pump 26 picks up diluted mud at the opposite end of the pit from that at which the diluted mud enters it. The mud which is picked up by pump 26 is substantially free from drilled solids but still retains most of the bentonite, combination of polymers, and other chemicals present in the mud circulated in the well. Thus, the stream returned to mud pit 12 through valve 27 and line 28 contains considerable amounts of these materials so the amounts of make-up bentonite, polymers and chemicals are greatly reduced. Since the stream from pump 26 flowing through valve 18 is substantially free from drilled solids, it is effective in diluting the stream flowing from pump 14 through valve 16. Since the stream is re-cycled, however, there is no addition of new water making necessary the rejection of a corresponding volume of drilling fluids.

Some make-up water will, of course, be required because of losses of mud with cuttings at the shale shaker, because of the increased volume of the well as it is drilled deeper, because of jetting of mud pits and the like. This make-up water is preferably added through valve 29 to the diluted mud passing to the hydrocyclone or directly to mud pit 24. The reason is that this water lowers the yield value and gel strength of the diluted mud, thus permitting the most effective settling of drilled solids. Make-up polymer is preferably also added through valve 29 to permit the flocculating action to be as great as possible. Make-up bentonite is preferably added to mud pit 12. If the yield value and gel strength of the mud picked up by pump 26 becomes too great because of too high a concentration of bentonite, a little calcium chloride solution introduced through valve 29 will cause precipitation of at least part of the bentonite in settling pit 24 together with the drilled solids. Caustic and quebracho can also be added to the stream flowing to mud pit 24 to improve settling of flocculated solids.

The unique properties of the copolymers make possible a very advantageous use of the copolymer alone without the polyacrylate in the system shown in FIG. 2. As previously noted, the high molecular weight copolymer has substantially no effects on bentonites. It neither beneficiates nor flocculates bentonite. It frequently happens in the use of high-solids muds that the drilled solids content reaches a very high value before any treatment is started. Thus, the viscosity, yield value and gel strengths are already about as high as can be tolerated. If a polymer having a beneficiating action on bentonite is added to such a drilling fluid, the viscosity, yield value and gel strength problems are made even worse. Eventually, of course, the drilled solids contents is reduced until the mud properties fall into a desirable range. After this happens, there are even some advantages to be gained by using a beneficiated bentonite system to reduce the total clay content to a low value and thus improve drilling rate. To begin with, however, addition of a beneficiating agent often cannot be tolerated.

In such cases, the high molecular weight copolymer can be added alone without the polyacrylate. The bentonite is not beneficiated, but neither is it flocculated, so it stays in the drilling fluid. The copolymer does flocculate the drilled solids, however, removing them from the mud in the system shown in FIG. 2. There are some advantages to use of the copolymer alone in high-solids mud systems. The principal advantage is that a high concentration of bentonite can be used to decrease fluid loss without increasing the gel strength or yield value sufficiently to prevent settling of flocculated drilled solids in pit 24. The high molecular weight copolymer seems to be unique in its ability to flocculate clays other than bentonite while showing substantially no effects on bentonite. Therefore, while any polymer which flocculates drilled solids but does not flocculate bentonite can be used, my acrylate-acrylamide copolymer is unique in its advantageous use in the process shown in FIG. 2.

Use of the polyacrylate alone without the copolymer to beneficiate bentonite is also advantageous in some cases. These applications have been described in U.S. patent application Ser. No. 392,627 to which reference has previously been made. At the time 392,627 was filed, the reason for the rather remarkable beneficiating action of the polymer was not known. Therefore, it seemed necessary to describe the polymer in terms of the method of manufacture. Subsequent work has shown that other polyacrylates having molecular weights in the same range also possess the unexpectedly great bentonite beneficiating action. Therefore, it would seem that the combination of the polyacrylate polymer and bentonite should be claimed in terms of the molecular weight range of the polymer rather than in terms of its method of manufacture. Concentrations of the polymer, ratios of polymer to bentonite, together with various applications and methods of use of the combination are described in U.S. application Ser. No. 392,627, to which reference should be made for these descriptions.

Both the polyacrylate and the acrylate-acrylamide copolymer can be produced by any of the many known means to form the very high molecular weight polymers. A good summary of such methods, together with references to detailed descriptions, are found in the Encyclopedia of Chemical Technology, 2nd ed., vol. I, pages 276 to 278, and pages 305 and 306. The Encyclopedia is by Kirk and Othner and is published by Interscience Publishers, Division of John Wiley & Sons, Inc., New York.

Several methods can be used to add the combination of polymers to either high or low-solids muds. The polymers can be sprinkled dry over the mud pit, for example. The dry powder can also be added through a hopper to the flowing mud stream. It is very much preferred, however, to prepare an aqueous solution of the polymers in a concentration of about 1 percent by weight. This solution is then added intermittently, or preferably continuously, to the mud system. The point of addition is usually at the point where the mud leaves the well or enters the mud pit. In some cases, introduction at other points, or at multiple points is advisible.

Preferred compositions and methods have been described above. Several alternates and variations have also been described. These are given by way of example only. I do not wish to be limited to these examples, but only by the following claims.

I claim:

1. A drilling fluid additive consisting essentially of a mixture of from about 30 to about 75 parts by weight of a water-soluble acrylate-acrylamide copolymer and from about 70 to about 25 parts by weight of a water-soluble polyacrylate, said copolymer having a molecular weight between about 3 million and about 20 million and having an acrylate to acrylamide mole ratio between about 2:98 and about 10:90, and said polyacrylate having a molecular weight between about 2 million and about 20 million, said molecular weights being determined by the light-scattering technique.

2. The additive of claim 1 in which said copolymer has a molecular weight between about 4 million and about 10 million and has an acrylate-to-acrylamide mole ratio between about 4:96 and about 6:94, and said polyacrylate has a molecular weight from about 3 million to about 10 million.

3. A pumpable drilling fluid comprising water, bentonite, a water-soluble acrylate-acrylamide copolymer and a water-soluble polyacrylate, the concentration of said bentonite being at least about 3.5 pounds per barrel of said drilling fluid and the total concentrations of said copolymer and said polyacrylate being at least about 0.01 pound per barrel of said drilling fluid, the ratio of said copolymer to said polyacrylate being between about 30:70 and about 75:25, said copolymer having a molecular weight between about 3 million and about 20 million and having an acrylate-to-acrylamide mole ratio between about 2:98 and about 10:90, and said polyacrylate having a molecular weight between about 2 million and about 20 million, said molecular weights being determined by the light-scattering technique.

4. The drilling fluid of claim 3 in which the concentrations of bentonite, copolymer and polyacrylate are insufficient to increase the yield value and 10-second gel strength of the drilling fluid above about 22 and about 17 pounds per 100 square feet, respectively, whereby flocculated drilled solids settle and thus maintain a low-solids content in said drilling fluid.

5. The drilling fluid of claim 4 in which the concentration of bentonite is between about 7 and about 14 pounds per barrel of drilling fluid, the total concentration of said copolymer and said polyacrylate is between about 0.02 and about 0.04 pound per barrel of drilling fluid, said copolymer has a molecular weight between about 4 million and about 10 million and has an acrylate-acrylamide mole ratio between about 4:96 and about 6:94, and said polyacrylate has a molecular weight from about 3 million to about 10 million.

6. A composition for increasing the viscosity of water consisting essentially of about 1000 parts by weight of bentonite and from about 0.1 to about 5 parts by weight of the composition of claim 1.

7. A composition for increasing the viscosity of water consisting essentially of about 1000 parts by weight of bentonite and from about 0.1 to about 5 parts by weight of a water-soluble polyacrylate having a molecular weight between about 2 million and about 20 million as determined by the light-scattering technique.

8. A pumpable aqueous slurry consisting essentially of water, at least about 0.5 weight percent of bentonite and an amount equal to from about 0.01 to about 0.5 percent by weight of a water-soluble polyacrylate having a molecular weight between about 2 million and about 20 million as determined by the light-scattering technique.

References Cited

UNITED STATES PATENTS

| | | | |
|---|---|---|---|
| 2,552,775 | 5/1951 | Fischer et al. | 252—8.5(C)MX |
| 2,702,788 | 2/1955 | Dawson | 252—8.5(A) |
| 2,751,367 | 6/1956 | Yost et al. | 252—8.5(A)X |
| 2,775,557 | 12/1956 | Morgan | 252—8.5(C) |
| 2,923,681 | 2/1960 | Hein et al. | 252—8.5(A) |
| 3,040,820 | 6/1962 | Gallus | 175—66 |
| 3,081,260 | 3/1963 | Park | 252—8.5(A) |
| 3,200,098 | 8/1965 | Goren | 260—29.6(H)X |
| 3,323,603 | 6/1967 | Lummus et al. | 175—65 |
| 3,338,320 | 8/1967 | Gilson et al. | 175—65 |
| 3,402,137 | 9/1968 | Fischer et al. | 260—29.6(A) |

FOREIGN PATENTS

| | | | |
|---|---|---|---|
| 734,551 | 5/1966 | Canada | 260—29.6(H) |

OTHER REFERENCES

Scanley, C. S.: "Acrylic Polymers as Drilling Mud Additives," in World Oil, July 1959, pp. 122, 124, 126, and 128.

PHILIP E. ANDERSON, Primary Examiner

U.S. Cl. X.R.

175—65, 66, 70; 252—8.5